United States Patent [19]
Lackey et al.

[11] 3,764,808
[45] Oct. 9, 1973

[54] APPARATUS FOR AUTOMATICALLY LIMITING THE SIZE OF AN X-RAY BEAM IN RESPONSE TO CASSETTE SIZE

[75] Inventors: Ray R. Lackey, Madeira; Carold R. Henninger, Reading, both of Ohio

[73] Assignee: Sybron Corporation, Rochester, N.Y.

[22] Filed: Nov. 26, 1971

[21] Appl. No.: 202,334

[52] U.S. Cl. ..........................................250/490
[51] Int. Cl. ............................................. H05g 1/00
[58] Field of Search .............................. 250/66, 105

[56] References Cited
UNITED STATES PATENTS

| | | | |
|---|---|---|---|
| 3,502,878 | 3/1970 | Stewart et al. | 250/105 |
| 3,581,094 | 5/1971 | Peyser | 250/105 |
| 3,518,435 | 6/1970 | Kok | 250/105 |

FOREIGN PATENTS OR APPLICATIONS

| | | | |
|---|---|---|---|
| 1,170,303 | 11/1969 | England | 250/66 |

Primary Examiner—Archie R. Borchelt
Assistant Examiner—B. C. Anderson
Attorney—Theodore B. Roessel

[57] ABSTRACT

The size of an X-ray beam is automatically adjusted in response to signals produced by a pair of continuously variable transducers, such as rotary potentiometers, mounted on a cassette holder. One of the transducers is preferably adjusted by a pivoted arm on the holder adapted to contact the side of a cassette positioned on the holder. The other transducer is preferably adjusted, through suitable gearing, by a cable connected to one of a pair of jaws which center the cassette on the holder. The preferred embodiment also has a switch and means to open the switch when there is no cassette on the holder in order to prevent the X-ray generator from being activated.

11 Claims, 4 Drawing Figures

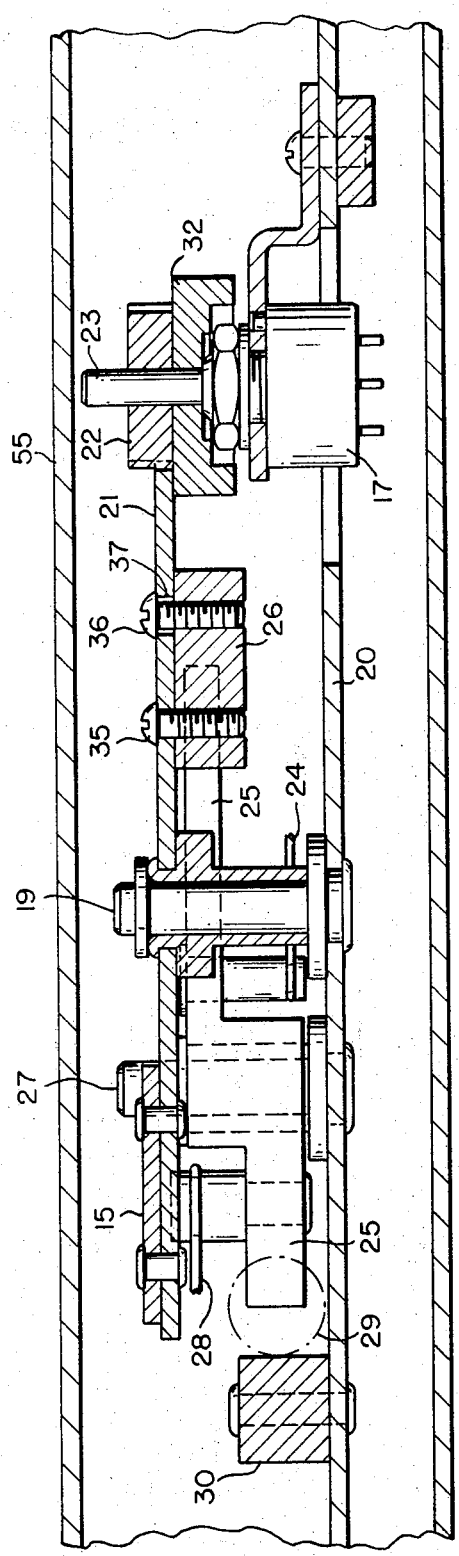
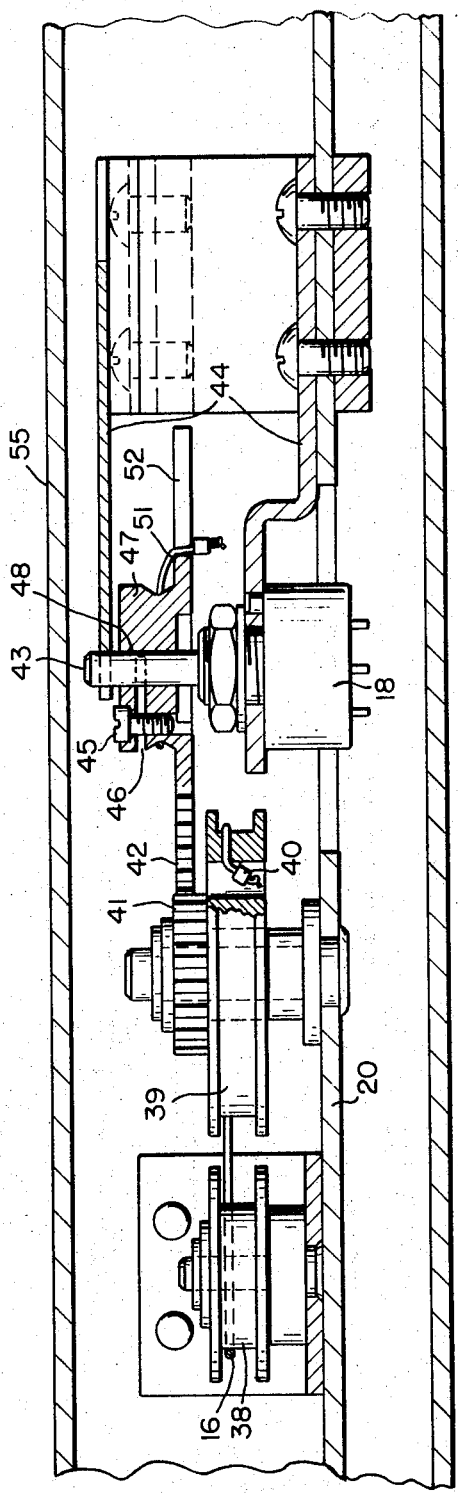

APPARATUS FOR AUTOMATICALLY LIMITING THE SIZE OF AN X-RAY BEAM IN RESPONSE TO CASSETTE SIZE

BACKGROUND OF THE INVENTION

This invention relates to X-ray apparatus and more particularly to apparatus for automatically adjusting the size of an X-ray beam in response to the size of the cassette in a cassette holder.

In the use of X-rays for medical diagnostic purposes, it is desirable to limit the size of the X-ray beam to substantially the exact size of the film, paper, plate or other X-ray sensitive material being exposed in order to minimize potential health hazards to the patient and fogging of the film or other sensitive material. In order to simplify the diagnostic procedure and to eliminate potential operator errors, it is also desirable to have these size adjustments performed automatically by the X-ray apparatus.

Systems for adjusting the size of an X-ray beam to correspond to standard X-ray film cassette sizes are disclosed in U.S. Pats. Nos. 2,921,202-Berger et al., 3,502,878-Stewart et al., 3,518,435-Kok and 3,581,094-Peyser et al. However, it would be desirable to have a system which would automatically adjust the X-ray beam to correspond to any X-ray cassette, standard or non-standard. Preferably, this system should also minimize the number of connections to the cassette holder. The Kok, Stewart and Peyser et al. systems, which utilize a plurality of switches corresponding to different cassette sizes, require a large number of connections between the cassette holder and the controls which adjust the size of the X-ray beam. As a result either the cassette holder must be permanently attached to the rest of the system, or an electrical connector with a large number of contacts must be employed.

SUMMARY OF THE INVENTION

It is an object of this invention to provide a system for sensing both the width and the length of a cassette that has substantially infinite resolution within a certain range of cassette sizes, i.e. which is continuously variable throughout the range of sizes. With this system the size of an X-ray beam can be adjusted to correspond to any cassette, standard or nonstandard, within this size range.

Another object of this invention is to provide a system for adjusting the size of an X-ray beam in response to the size of a cassette in a holder in which the number of connections between the cassette holder and the means for adjusting the size of the beam are minimized. As a result, the components that sense the cassette size can be permanently mounted on the cassette holder and the holder can be removed from the system without breaking a large number of connections.

Basically, this invention provides a cassette holder having a pair of continuously variable transducers mounted thereon, means for adjusting these transducers proportional to the width and the length of a cassette in the holder, and means to connect the transducers to apparatus for adjusting the size of an X-ray beam. Since the transducers are continuously variable, the size of the beam may be adjusted to correspond to any size cassette, standard or nonstandard, within the range of cassette sizes the holder is designed to accommodate. In addition the use of continuously variable transducers minimizes the number of connections which must be made between the cassette holder and the beam adjusting apparatus.

A still further object of our invention is to provide means for automatically preventing operation of an X-ray system if a holder without a cassette in it is accidentally inserted in the system. This is accomplished by mounting a switch on the holder and utilizing the width sensing means to automatically open this switch if a holder without a cassette is inserted in the system.

Other objects and advantages of this invention will be apparent from the following detailed description.

DRAWINGS

FIG. 3 is an enlarged cross-sectional view, taken along lines 3—3 of FIG. 2, showing the width sensing transducer and some of the means for adjusting it.

FIG. 4 is a similar enlarged sectional view taken along lines 4—4 of FIG. 2, showing the length sensing transducer and associated elements.

DETAILED DESCRIPTION

Figure 1:
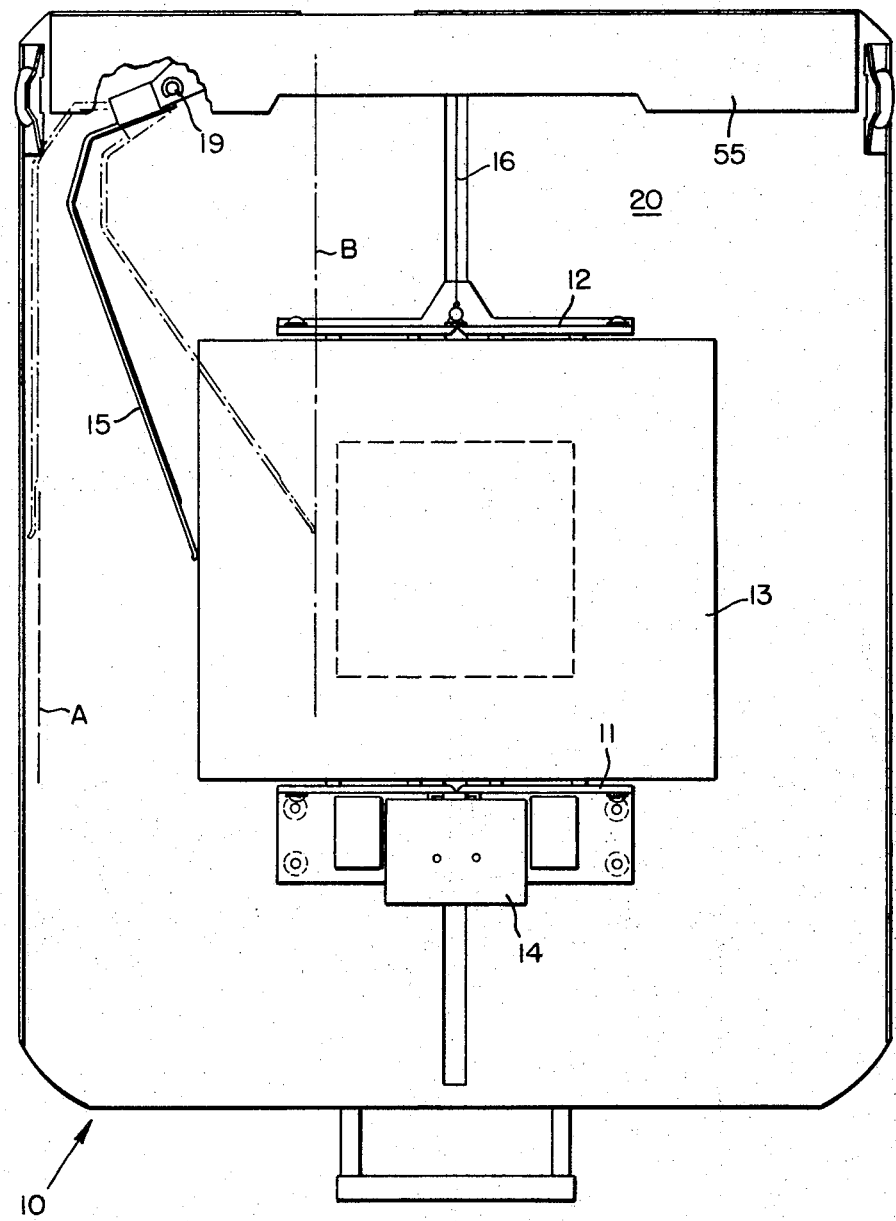
FIG. 1 is a plan view of one embodiment of this invention.

FIG. 1 illustrates an X-ray cassette tray or holder 10 adapted to be inserted in a Bucky diaphragm or similar carriage in an X-ray diagnostic system such as an X-ray table. The holder has front and rear centering jaws 11, 12 adapted to grip a cassette 13 in which a film, paper, plate or similar sensitive material is mounted. The jaws may be secured in place by a lock 14 attached to the front jaw 11. The jaws and lock are disclosed in more detail in the co-pending application of Ray R. Lackey, Carold R. Henninger and Henry J. Schneider, Ser. No. 202,335, filed Nov. 26, 1971. The holder 10 also has a pivoted arm 15 adapted to contact the side of cassette 13, and a cable 16 attached to the rear jaw 12. The pivoted arm and cable are connected to transducers positioned beneath a cover 55 on the rear of the holder. In the illustrated embodiment the transducers, which are shown in FIGS. 3 and 4, are a pair of rotary potentiometers 17, 18. Of course, rotary potentiometers, like a number of other transducers that might be used in this invention, are actually adjusted in a series of very small steps. Thus, strictly speaking they are not continuously variable. However, the individual adjusting steps of typical rotary potentiometers are so small that, for the purposes of adjusting the size of an X-ray beam, these potentiometers can be considered to be continuously variable.

Figure 2:
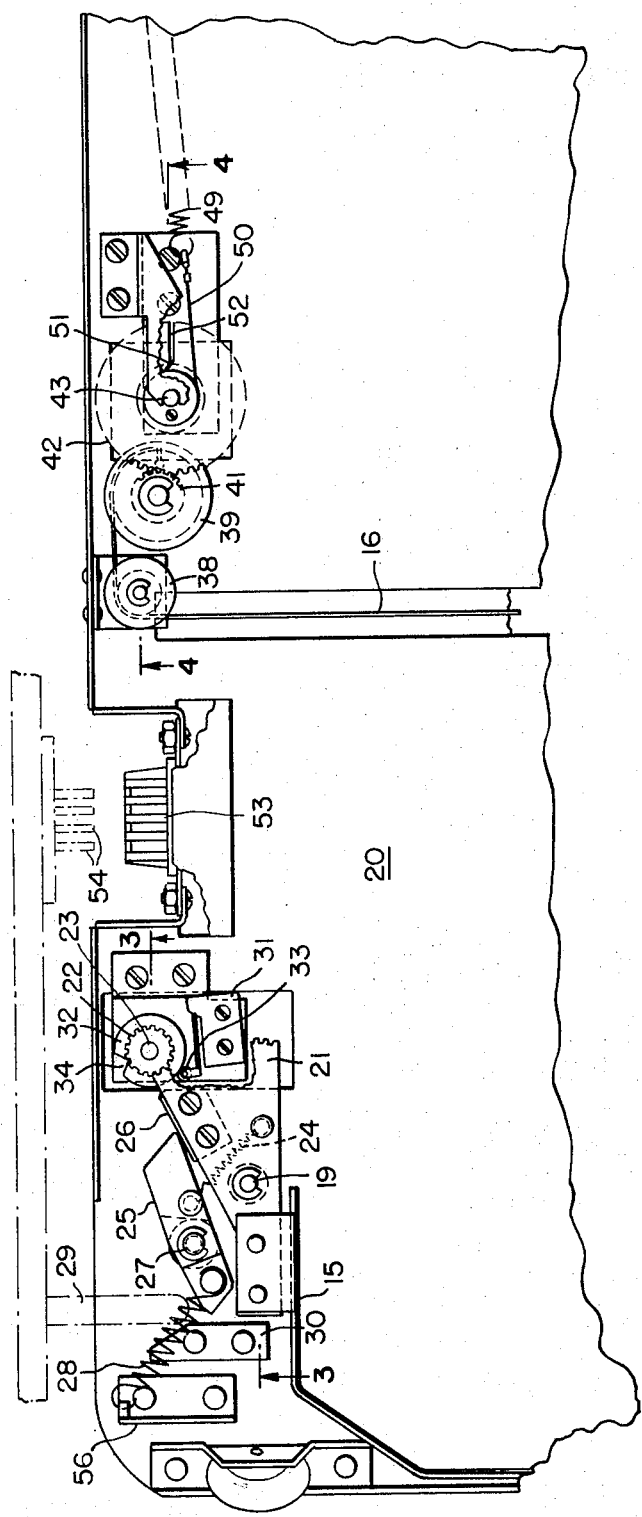
FIG. 2 is an enlarged plan view of the rear of the holder shown in FIG. 1 with the cover removed to show the means for adjusting the transducers.

Referring to FIGS. 2 and 3, arm 15 is pivoted about a post 19 mounted on the top plate 20 of the holder. A segment gear 21 on the end of arm 15 meshes with a gear 22 attached to the adjusting shaft 23 which extends from rotary potentiometer 17. Gear 22 and segment gear 21 are sized so that the adjusting shaft 23 of the potentiometer is rotated through approximately 220° as the pivoted arm 15 rotates from the position corresponding to the largest cassette for which the holder is designed to the position corresponding to the smallest anticipated cassette.

One potentiometer that has been found satisfactory for use with this arrangement is Spectrol Electronics Corporation's Model 140, which has an electrical range of 250° and a resolution percentage of 0.255 percent. Thus, in a 220° arc, this potentiometer provides approximately 300 adjusting steps. When this potentiometer is used in connection with standard X-ray beam adjusting equipment the individual steps in the adjustment of the beam are too small to be noticeable. Thus, in effect the system, and the potentiometer, are continuously variable.

FIG. 1 illustrates in phantom the positions of the pivoted arm 15 corresponding to the smallest and largest cassettes. The post 19 about which the arm is pivoted is located intermediate a line A defined by the side of the largest cassette and a line B defined by the side of the smallest cassette. This is done to make the relationship between the cassette size and the potentiometer setting as nearly linear as possible. In order to faciliate precise adjustment of the X-ray beam to the exact size of any cassette, it would be preferable to have a linear relationship between the cassette size and the potentiometer setting. With a pivoted arm, this relationship is not precisely linear because the position of the arm, and thus the potentiometer setting, are linearly related to the sine of the angle formed by the side of cassette 13 and a line from the point of contact between arm 15 and cassette 13 through pivot post 19. In order to keep this angle at a minimum, pivot post 19 is preferably positioned substantially equi-distant between the line A defined by the side of the largest cassette and the line B defined by the side of the smallest cassette.

Another step taken to keep the relationship between the cassette width and the potentiometer setting as nearly linear as possible is the use of an offset pivoted arm. As seen in FIG. 1, arm 15 is offset to provide clearance for the larger cassettes. As a result, the end of the arm contacts all sizes of cassettes, which keeps the distance from the pivot point to the point of contact with the cassette substantially constant and thereby helps minimize deviation from linearity.

In order to facilitate insertion of a cassette into the holder, means are provided for pivoting arm 15 away from the cassette when the holder is removed from the X-ray table. As shown in FIGS. 2 and 3, a spring 24 is attached to the pivoted arm 15 and to a pivoted stop 25. The spring biases the pivoted arm towards the stop. However, rotation of the arm in this direction is limited by a block 26, attached to the pivoted arm 15, which contacts the pivoted stop 25. Stop 25 is pivoted about a post 27 mounted on the top plate 20 of the holder. A second spring 28 attached to the stop 25 and to a bracket 56 secured to the top plate 20 of the holder tends to rotate the stop 25 clockwise. As a result, when the holder is removed from the table, stop 25 rotates clockwise and contacts the block 26 on the pivoted arm, thereby rotating the pivoted arm 15 clockwise toward the side of the holder. As a result, the arm does not interfere with the changing of cassettes.

When the holder is inserted in the table, a post 29 on the table (shown in phantom) hits stop 25 and rotates it counterclockwise. A guide 30 is provided to facilitate alignment of the holder with the post on the table. The arm 15 rotates counterclockwise with the pivoted stop 25 until the end of the arm 15 contacts the cassette, at which point the arm stops. If there is no cassette in the holder, the arm continues to rotate with the stop. This operates a safety switch 31 that prevents the X-ray tube (not shown) from being activated when there is no cassette in the holder.

The switch 31 is operated by a disk 32 mounted on the adjusting shaft 23 of the rotary potentiometer 17. A roller level actuator 33 on switch 31 rides on the rim of this disk. When a holder is inserted in the table without a cassette in it and the arm pivots all the way with the stop, the roller drops into a notch 34 on the rim of the disk. This opens the switch, thereby deactivating the X-ray tube and preventing accidental exposures without a cassette. The position in which the notch 34 on disk 32 stops when the arm is pivoted all the way can be adjusted by adjusting the position of the block 26 on the pivoted arm. As best seen in FIG. 3, block 26 is mounted on the pivoted arm by a pair of screws 35, 36. One of the screws 36 extends through an enlarged hole 37 in the arm which permits adjustment of the position of the block on the arm.

As was mentioned above, the length of the cassette in the holder is sensed by a second rotary potentiometer 18 connected through gearing means and a cable 16 to the rear centering jaw 12. Referring to FIGS. 2 and 4, from the jaw the cable passes around an idler pully 38 and onto a rotary drum 39 to which the other end 40 of the cable is attached. A gear 41 on top of drum 39 meshes with a gear 42 mounted on the adjusting shaft 43 of the rotary potentiometer 18, which is held in place by a bracket 44 to the top plate 20 of the holder. As best seen in FIG. 4, gear 42 is attached to the adjusting shaft 43 through a screw 45 which closes a horizontal slot 46 in the hub 47 of gear 42 and thereby deforms the bore 48 through which the adjusting shaft 43 passes.

The cable 16 from the centering jaw 12 to the rotary drum 39 is kept taut by a spring 49 and a second cable 50, attached to spring 49, which extends around the hub 47 of the gear 42 on the adjusting shaft of the potentiometer. The other end 51 of this cable is secured in a radial slot 52 in the gear. The cable and spring tend to rotate gear 42 counter-clockwise, which rotates the rotary drum clockwise and keeps slack out of the cable 16 connected to the rear centering jaw.

The gear 41 on the rotary drum and the gear 42 attached to the shaft of the potentiometer are sized so that the adjusting shaft 43 is rotated through approximately 220° as the rear centering jaw moves through its range of travel. As a result, the same type of potentiometer can be used for sensing the length as is used for sensing the width of the cassette.

The two potentiometers 17, 18 and the no-cassette sensing switch 31 are connected to an eight contact plug 53 mounted on the rear of the holder. When the holder is inserted in an X-ray table, the plug makes contact with the prongs 54 of a male connector (shown in phantom in FIG. 2) on the table. This connects the potentiometers to a system (not shown) for controlling the size of a X-ray beam and connects the safety switch to the controls (not shown) for energizing the X-ray tube.

The holder described above may be used with a number of conventional X-ray beam size limiting systems in order to adjust the beam size to correspond to any cassette, standard or nonstandard, within the range of cassette sizes that the holder is designated to accommodate. Thus, this holder provides much greater flexibility than any previous system for automatically adjusting the X-ray beam size and also minimizes the number of connections that must be made to the holder. Of course, the holder described above is but one example of many possible embodiments of our invention and many modifications may be made to this holder within the scope of this invention, which is defined by the appended claims.

We claim:
1. A size sensing X-ray cassette holder comprising:
   a. means for centering a cassette in the holder;
   b. an arm pivoted about a point intermediate a first line defined by the side of the largest cassette the holder is designed to be used with and a second line defined by the side of the smallest cassette the holder is designed to be used with, said arm having a free end adapted to contact a side of the cassette;
   c. a continuously variable transducer, means for adjusting the transducer; and
   d. means for connecting the pivoted arm to the transducer adjusting means, whereby the transducer is automatically adjusted as the arm pivots.
2. A holder according to claim 1 wherein the means for centering the cassette comprises a pair of jaws, further comprising:
   a. a second continuously variable transducer, means for adjusting said second transducer; and
   b. means for connecting one of the centering jaws to the means for adjusting said second transducer, whereby said second transducer is automatically adjusted as the jaws are moved to grip the cassette.
3. A holder according to claim 2 wherein:
   a. the second transducer is a rotary potentiometer;
   b. the means for adjusting the potentiometer comprises a rotary shaft extending from the potentiometer; and
   c. the means for connecting the centering jaw to the rotary shaft of the potentiometer comprises a cable attached to the centering jaw and gear means connecting the cable to the rotary shaft of the potentiometer.
4. A holder according to claim 1 wherein:
   a. the transducer is a rotary potentiometer;
   b. the means for adjusting the potentiometer comprises a rotary shaft extending from the potentiometer; and
   c. the means for connecting the pivoted arm to the shaft comprises a segment gear on the pivoted arm and a gear attached to the adjusting shaft.
5. A holder according to claim 1 wherein the arm pivots about a post mounted substantially equi-distant between said first line and said second line.
6. A holder according to claim 1 wherein said arm is offset to provide clearance for said largest cassette.
7. A size sensing X-ray cassette holder comprising:
   a. a pair of jaws adapted to center a cassette inserted in the holder;
   b. a continuously variable transducer having a rotary adjusting shaft extending therefrom; and
   c. a cable having one end attached to one of the centering jaws and the other end attached to a rotary drum, and gearing means connecting the drum to the rotary adjusting shaft, whereby the transducer is automatically adjusted as the jaws are moved to grip the cassette.
8. A holder according to claim 7 wherein the transducer is a rotary potentiometer.
9. A holder according to claim 8 wherein the gearing means includes a gear mounted on said adjusting shaft and the holder further comprises biasing means connected to the gear on the adjusting shaft adapted to rotate said gear and thereby take up slack in said cable.
10. A holder according to claim 8 wherein said gearing means comprises a gear on the rotary drum that meshes with a gear on the adjusting shaft of the potentiometer.
11. In a size sensing x-ray cassette holder having a pivoted arm adapted to contact a side of a cassette mounted in the holder; the improvement comprising:
   a. a pivoted stop adapted to pivot independently of said pivoted arm and to contact the arm and limit the movement of the arm;
   b. a first spring tending to rotate the stop in a first direction and thereby move the pivoted arm away from the cassette;
   c. said pivoted stop being adapted for rotation in a direction opposite to said first direction by a projecting member on an X-ray system when the holder is inserted in the X-ray system, whereby said pivoted arm is free to rotate towards the cassette; and
   d. a second spring urging the pivoted arm towards the pivoted stop, whereby when the holder is inserted into the X-ray system the arm pivots with the stop until the arm contacts the side of the cassette.

* * * * *